(12) United States Patent
Shimko et al.

(10) Patent No.: US 7,139,730 B1
(45) Date of Patent: Nov. 21, 2006

(54) SYSTEM, METHOD, AND COMPUTER PROGRAM PRODUCT FOR COLLATERAL MANAGEMENT OPERATIONS

(76) Inventors: David Shimko, 645 W. End, Apt. 3A, New York, NY (US) 10025; Richard Apostolik, 28 Edgemont Ave., Summit, NJ (US) 07901; H. Brett Humphreys, One Columbus Pl., N32D, New York, NY (US) 10019

( * ) Notice: Subject to any disclaimer, the term of this patent is extended or adjusted under 35 U.S.C. 154(b) by 0 days.

(21) Appl. No.: 09/294,898

(22) Filed: Apr. 20, 1999

(51) Int. Cl.
G06F 19/40 (2006.01)
(52) U.S. Cl. .............................. 705/35; 705/37; 705/38
(58) Field of Classification Search .................. 705/35, 705/36, 37, 38, 39
See application file for complete search history.

(56) References Cited

U.S. PATENT DOCUMENTS 5,802,499 A 9/1998 Sampson et al. ............. 705/35

OTHER PUBLICATIONS

Lee, How to use collateral, Euromoney n319, pp. 4-49, Nov. 1995.*
International Search Report for Application No. PCT/US97/08470 issued Feb. 8, 2002, 3 pages.
Larr, P., "Two sides of collateral: Security and danger," *Journal of Lending and Credit Risk Management*, vol. 78, No. 9, printed from Dialog File, 8 pages (May 1996).
Chicago Mercantile Exchange,"CME Swaps Collateral Depository Report," Apr. 1995, 17 pages.
*RiskMeterics—Technical Document*, Chps. 6-7, Fourth Edition (Dec. 1996), Morgan Guaranty Trust Company, pp. iii-xii and 103-160 from http://www.riskmeterics.com/rm/pubs/index.html.

* cited by examiner

*Primary Examiner*—Richard C. Weisberger
(74) *Attorney, Agent, or Firm*—Richard C. Litman

(57) ABSTRACT

A centralized collateral management operation system that includes a collateral management system (CMS) provider linked to a trading group—a plurality of users (e.g., individuals, corporations, financial institutions, and the like). The method allows the CMS provider to dynamically determine anticipatory collateral value and mark to market (MTM) collateral obligations for each of the users' sub-portfolios. The provider is then able to notify each of the users of their MTM and anticipatory collateral obligations for their respective sub-portfolios, and issue "Collateral Credits." The Collateral Credits allow the CMS provider to efficiently allocate the amount of collateral posted by each member of the trading group to protect against present losses and potential future losses due to the inability of the user to meet its obligations. The system provides equivalent collateral protection as a fully collateralized bilateral system while decreasing individual collateral requirements.

26 Claims, 13 Drawing Sheets

MTM COLLATERAL POSTINGS FOR COMPANY A

ANTICIPATORY COLLATERAL POSTINGS FOR COMPANAY A

MTM COLLATERAL POSTINGS FOR COMPANY A

ANTICIPITORY COLLATERAL POSTINGS FOR COMPANY A

SYSTEM, METHOD, AND COMPUTER PROGRAM PRODUCT FOR COLLATERAL MANAGEMENT OPERATIONS

BACKGROUND OF THE INVENTION

1. Field of the Invention

The present invention relates generally to financial management systems, and more particularly to collateral management systems for trading groups.

2. Related Art

In the financial industry, two parties typically engage in a transaction, for example, where one party A loans money to another party B. Parties A and B can be individuals, corporations, financial institutions, or the like. Upon lending money to party B, party A exposes itself to the risk of B's default—B's failure to promptly pay interest or principal on the loan when due. In order for A to protect itself against the risk of B defaulting on the loan, A will usually require B to post collateral. Generally speaking, collateral are certain assets belonging to a borrower (i.e., party B), that are set aside and pledged to a lender (i.e., party A) for the duration of a loan. If the borrower fails to meet its obligations to pay principal or interest, the lender has claim to the assets.

In another example, party A may wish to protect itself from B defaulting on a forward contract. Forward contracts, as is well known in the relevant art(s), are agreements to buy or sell a particular type and grade of commodity at a particular price for delivery at an agreed-upon place and time in the future. The subject commodity of the forward contract can be any commonly traded bulk good (e.g., a particular crop, livestock, oil, gas, metals, t-bills, foreign exchange rate, etc.). The failure to perform by a buyer or a seller on a forward contract as required by the terms of the contract is another form of default.

Collateral is a simple way for party A to protect against the risk of the default on an obligation by a counterparty (i.e., party B). If a counterparty has posted collateral, then the collateral can be taken to offset the loss due to the default. Collateral can be posted based on two types of obligations: actual and potential. When collateral is posted to cover an actual exposure (i.e., a loss that has already occurred on a position but has not yet been settled), it is called "mark to market" (MTM) collateral. If collateral is posted to cover potential losses that have not yet occurred, it is called "anticipatory" collateral.

A "position" refers to the amount of a security or commodity (e.g., note, stock, bond, commodity option contracts, etc.) either owned or owed by a party. If a security is owned by a party, it is referred to as a "long" position with respect to that party. In contrast, if a security is owed by a party, it is referred to as a "short" position with respect to that party.

A typical company (e.g., party A) that undertakes trades, can have existing trades in place with a large number of counterparties. Referring to FIG. 1A, a block diagram illustrating such a network of obligations 100 (e.g., a trading system) from the perspective of Company A is shown. Each line within FIG. 1A represents an active portfolio of obligations between Company A and a specific counterparty. Company A has existing trades with counterparties B, C, D, E, F, and G, as shown in FIG. 1A. Company A "sees" only the part of the network 100 in which it is directly involved. The complete network 100, however, is more complex and can be represented by FIG. 1B. FIG. 1B is a block diagram illustrating the complete network 100 and depicts all of the interactions among the participants throughout the entire network.

To protect itself from credit losses, Company A could obtain collateral from its counterparties (i.e., counterparties B, C, D, E, F, and G). Each collateral interaction follows the same lines as the trade interactions shown in FIG. 1A. Mark to market collateral is posted by the counterparty who has an MTM loss on its portfolio. Hence, for every trading pair, one of the two counterparties should be posting collateral. This simply protects against a loss that has already occurred. However, any risky position has the potential for future losses that could cause a default. To protect against these losses anticipatory collateral is posted.

Anticipatory collateral also follows the same lines as the trade interactions shown in FIG. 1A. However, unlike MTM collateral, both counterparties in a trading pair may be posting anticipatory collateral. For example, in a situation where A buys from B, A needs to provide B with anticipatory collateral to protect against the possibility of falling prices, while B needs to provide A with anticipatory collateral to protect against the possibility of rising prices. The exact level of anticipatory collateral is difficult to ascertain. The appropriate level of anticipatory collateral should protect against potential losses while not becoming so large that it is an oppressive burden. Anticipatory collateral levels are generally set at a point such that they will completely cover the potential loss 95% to 99% of the time. In the event of a default, the anticipatory collateral is used to lessen the total amount of the loss. For companies with positions having a very large positive value, no anticipatory collateral may be required as it would be unreasonable to expect to lose all of the accumulated profits over a short time period. However, in most cases both parties will be required to post anticipatory collateral, especially when both parties have future delivery or payment obligations, as in a long term futures contract.

In a situation where Company A and Company B are both posting collateral to cover the potential credit risk of their respective portfolios, a, collateralized default example can be illustrated. More specifically, if the following series of transactions occur:

(1) MTM collateral from Company B to Company A=$3 M;

(2) Anticipatory collateral from Company B to Company A=$4 M; and (3) Anticipatory collateral from Company A to Company B=$2 M.

Currently, the position has moved in Company A's favor resulting in their receipt of mark to market collateral. In total, Company A has $7 M of protection and Company B has $2 M. If the next day, for example, the market moves in favor of Company B leading to a new MTM value of (−$2 M), Company B would be able to remove $1 M of their posted collateral. In addition, Company A may be required to increase the size of the anticipatory collateral that they are posting into the network 100 to cover their potential for larger losses now that the position is not as much in their favor. Alternatively, if the next day the market moves significantly against Company B leading to a new MTM value of (−$8 M), Company B would be required to post a total of $8 M of MTM collateral (i.e., $5 M of additional collateral). If Company B could not, it may be considered in default under the terms of party A and B's contract and any applicable trading system or exchange rules. Thus, this situation would be resolved by the following series of transactions:

(1) Company A receives the existing MTM collateral=$3 M;

(2) Company A receives the existing anticipatory collateral=$4 M; and (3) Company B defaults on the remaining amount=1 M.

Note that in any transaction, the total of the three values of each step (1) to (3) must equal the total MTM value at the time of the default. Without anticipatory collateral in the event of a default, a counterparty is exposed to the entire size of the market move that has occurred since the last MTM collateral posting. Without MTM collateral, each company would be exposed to any change in value since entering the position.

To appropriately determine the size of the anticipatory collateral, the potential exposure of the position must first be identified. As is well known in the relevant art(s), the statistical measure of standard deviation, $\sigma$, is a common method of measuring the average distribution around a mean. By using a standard deviation of the value of an asset, the potential loss exposure can be calculated. This potential exposure can then be used to determine an appropriate level of anticipatory collateral.

The correct amount of anticipatory collateral should take into account the risk of an entire portfolio. Anticipatory collateral must therefore take into account the benefits of diversification. Diversification describes the principle of how risk tends to be reduced as an investment is spread across more assets. For example, an investment in a portfolio made up of two equally-risky assets will be less risky than the same sized investment in either asset alone. The size of the decrease in risk due to diversification will depend upon statistical relationships between the two assets.

Anticipatory collateral calculations that take into account portfolio diversification benefits are identical to those used to measure the "Value at Risk" of a portfolio. As such, any of the methods (e.g., variance-covariance, Monte Carlo simulation, historical) well known in the relevant arts that can be used to calculate Value at Risk can also be used to calculate anticipatory collateral. For this reason, Value at Risk measurements provide a good starting estimate of appropriate anticipatory collateral on an individual asset basis as well as on a portfolio basis. An in-depth discussion of calculating Value at Risk can be found in Jorion, Philippe, *Value at Risk: The New Benchmark for Controlling Market Risk*, Irwin Professional Pub. (Chicago, Ill.), 1997, ISBN 0786308486, and in J. P. Morgan, *Riskmetrics Technical Document*, available at URL: http://www.riskmetrics.com/rm/pubs/index.html, which are both incorporated herein by reference in their entirety.

There are two basic types of forward markets—futures exchanges and the over the counter (OTC) markets. The OTC market has been described previously and is represented by network 100. The futures exchange system is significantly different. In this type of system an exchange becomes the counterparty to every transaction (i.e., the buyer for every seller and the seller for every buyer). This simplifies the network of trades to a simple hub and spoke model system 200 as shown in FIG. 2. However, this simplification of the complex OTC network comes at the cost of a significant loss of flexibility in contract specifications. In addition, clearing houses for exchanges generally share the credit risk associated with default between and among its members. This process is known as "mutualization of risk."

Collateral can be provided easily in futures markets as each company has only one counterparty—the exchange. However, many companies do at least some of their trading within the OTC market. In effect, the exchanges can be viewed as another counterparty in the OTC market. As previously discussed, the OTC market consists of many individual trading companies as represented in FIG. 1B. If each of these companies were to provide MTM and anticipatory collateral of sufficient size to each of its counterparties, it would lead to the necessity of posting very large amounts of collateral. These amounts of collateral would in fact be much larger than actually needed. The excess collateral arises because each pair of companies is only aware of trades directly between the pair and posts collateral based only on this knowledge. This leads to a complex network of bilateral collateral postings between counterparties (see FIG. 1B) and inefficient collateral usage. Referring to FIG. 3, an example of required MTM collateral postings for Company A is shown. In this example, Company A is receiving a total of $7 M in collateral (from B, E, and G), pays a total of $8 M in collateral (to C and F), and has no collateral transfer with Company D.

Only collateral postings for MTM positions are shown in FIG. 3. Company A, however, must also post anticipatory collateral to cover its potential exposures. This level is typically determined by each counterparty regardless of the MTM position of the trades with each company. Referring to FIG. 4, an example of required anticipatory collateral postings for Company A is shown. In this example, Company A must post a total of $11 M in anticipatory collateral (to companies A–G). Although not shown in FIG. 4, each of Company A's trading partners would also post anticipatory collateral to party A.

By providing collateral in this way, companies in a trading system are assuming the worst possible situation. That is, Company A is forced to: (1) post excess MTM collateral as it can not re-use the collateral posted to it; and (2) post excess anticipatory collateral because the diversification benefits of trades with different counterparties are ignored. Such inefficiencies and the resulting excessive collateral demands have been a factor in deterring some trading communities from requiring collateral. For example, consider a situation where Company A is short a certain position to F and long the same position to G. In such a case, the two trades should offset each other and thus require no collateral. However, as seen in FIG. 3 and FIG. 4, Company A is providing a total of $4 M in collateral to F and G.

Therefore, what is needed is a system, method, and computer program product for collateral management that determines the efficient amount of collateral posted by each member of a trading group. This trading group may consists of individuals, independent companies, and/or exchanges. This amount of collateral must be sufficient to protect against present losses and/or potential future losses due to the inability of that member to meet its obligations. The overall system, method, and computer program product should provide equivalent collateral protection as a fully collateralized bilateral system while decreasing individual collateral requirements.

SUMMARY OF THE INVENTION

The present invention is a system, method, and computer program product for collateral management operations. The system includes a centralized collateral management service provider linked to several companies (i.e., users) that form a trading group in a "hub and spoke" fashion. The centralized collateral management method involves the provider first obtaining the mark to market exposure between each counterparty using the system. This can be done in two ways. First, the provider can obtain mark to market exposures by having each user or a representative directly submit their mark to market exposure associated with each of their counterparties. Alternatively, the provider can obtain mark to market exposures by receiving a plurality of market positions from each of the users. These market positions can be divided into the positions associated with a single counterparty representing a sub-portfolio. The provider can then obtain market data in order to valuate each of the market positions and determine a mark to market (MTM) value for each of the sub-portfolios. The provider can also give the obtained positions to a third party (i.e., an external service) and have that third party provide MTM values for each of the sub-portfolios. The MTM value of each sub-portfolio is then used to determine the MTM collateral obligations between members of the system. The collateral management service provider can then recognize "Collateral Credits" equal to the value of the MTM collateral obligations owed to the user.

If the sub-portfolio positions are submitted directly to the collateral management service, then the provider (or the external service) can dynamically determine an anticipatory collateral value for each of the sub-portfolios as well as the anticipatory collateral required for the total portfolio. The collateral management service can then recognize Collateral Credits to each of the users based on the anticipatory collateral value.

The collateral obligation is then determined as the sum of all exposures for which MTM and/or anticipatory collateral is owed. The Collateral Credits that have been provided by the collateral management service are applied against this value to determine if collateral must be posted to the system. The provider is then able to notify each of the users of their MTM and anticipatory collateral obligations for their respective sub-portfolios and the net payment required.

One advantage of the present invention is that use of collateral is made easier by allowing participants to use non-standard types of collateral such as letters of credit or parent guarantees as well as standard collateral such as currency and securities (e.g., bonds and equities). The present invention also expands collateral to allow parent guarantees, self guarantees and letters of credit to become divisible claims that can be reassigned.

Another advantage of the present invention is that equivalent collateral protection as a fully collateralized bi-lateral system is provided, while decreasing individual collateral requirements through the recognition and use of Collateral Credits. These credits are derived from currently profitable positions and diversification benefits.

Another advantage of the present invention is that collateral is reduced to the level required if all positions were settled through a clearinghouse, and can be done without mutualization of risk.

Another advantage of the present invention is provision of anticipatory collateral for an over the counter (OTC) market across a broad range of products.

Yet another advantage of the present invention is the ability to aggregate OTC and/or futures market positions, and the ability to net across positions, instruments and counterparties, where counterparties are defined as, exchanges, contract markets, banks, and/or other trading partners.

Further features and advantages of the invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE PREFERRED EMBODIMENTS

Table Of Contents

Figure 1A:
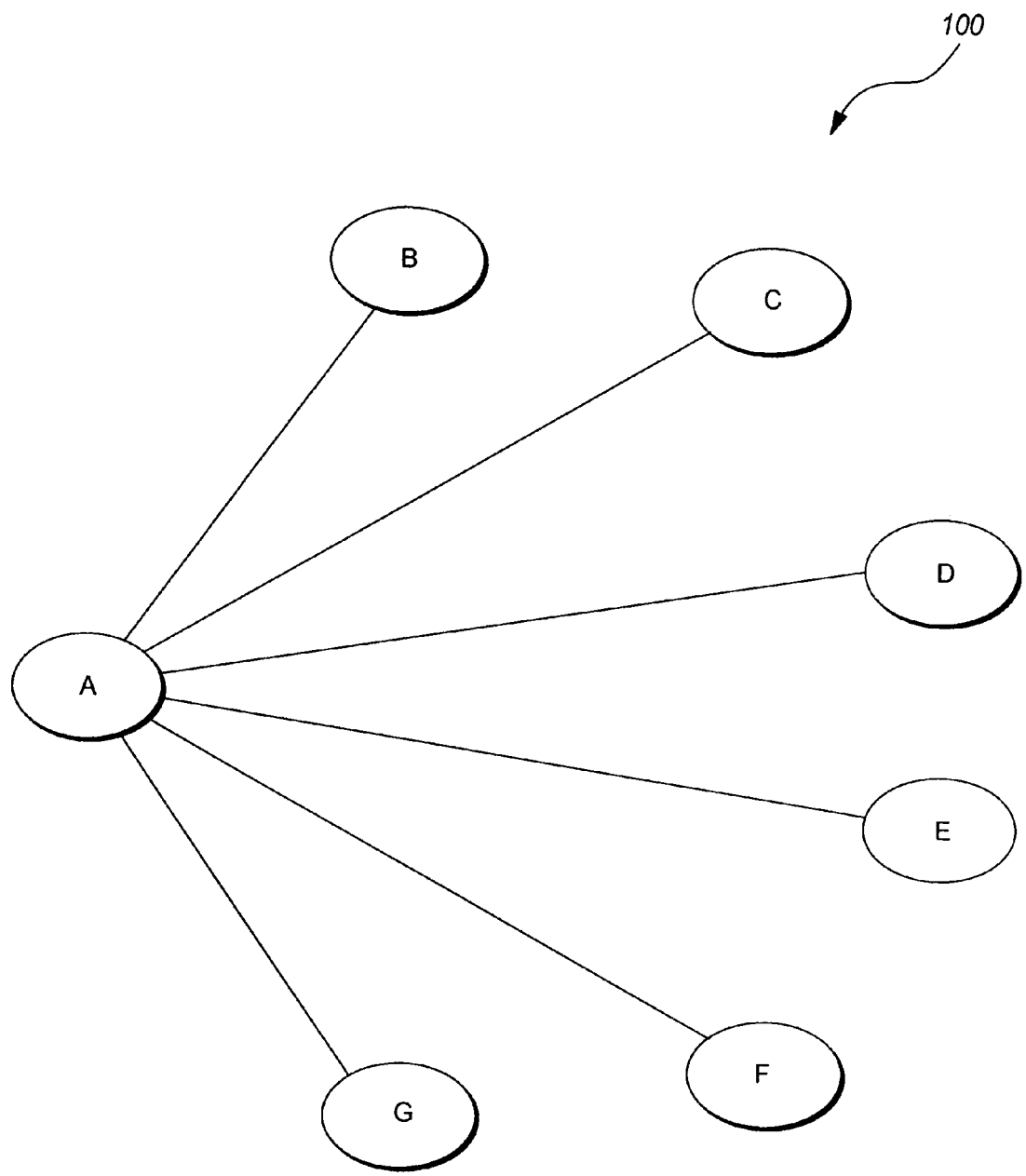
FIG. 1A is a block diagram illustrating a typical over the counter network of obligations from the perspective of a single participant.

I. Introduction
II. System Architecture
III. System Operation Overview
IV. Detailed Example of System Operation
   A. Conventional Collateral Management System (CMS) Process
   B. Present Invention's CMS
   C. Detailed Anticipatory Collateral Calculations
   D. Use of Expanded Collateral within the CMS
   E. Extensions to the Basic Trading Model
V. Environment

VI. CONCLUSION

I. Introduction

The present invention relates to a system, method, and computer program product for collateral management operations. In an embodiment of the present invention, an organization provides a centralized collateral management system (CMS) so that participants (i.e., a trading group) can participate in a network of obligations (e.g., a trading system) that determines the efficient amount of collateral posted by each member of the network. This amount of collateral must be sufficient to protect against present losses and/or potential future losses due to the inability of that member to meet its obligations. The basis for this is the underlying diversification that exists within the positions held by each participant when considered collectively as a group.

The organization that provides the centralized CMS offers a more simplified collateral network than that of the conventional over the counter (OTC) network 100. However, the organization does not interfere with any bilateral over the counter (OTC) trade terms that broker-dealers (i.e., members of the trading group) negotiate directly with one another.

The CMS provider organization would supply an infrastructure, protocol, and facilities so that trading group members can utilize the collateral network to address their trading needs. In an embodiment of the present invention, the CMS provider would furnish subscribing members of the trading group with software, documentation, and a set of system rules (e.g., an executed group membership agreement) to implement an embodiment of the CMS protocol as presented herein.

Each group member (i.e., user) of the CMS supplies to the CMS, information about its trade activities with each of the other users on the system. The CMS uses this information, along with market data where necessary, to determine collateral requirements. The CMS can minimize the amount of posted collateral required in at least two ways. First, the CMS takes all collateral, regardless of type, posted to a company and issues Collateral Credits which the company can then use as collateral. The Collateral Credits can exist primarily in a book entry form within the CMS but represent an obligation by the CMS provider organization (or its insurers) to pay the counterparty up to the face amount, if the holder defaults and other forms of collateral are insufficient. This is similar to a standby letter of credit.

Second, if the user's positions have been reported, the CMS calculates the potential loss exposure that the company faces on its entire portfolio and on each sub-portfolio to determine anticipatory collateral. The CMS then issues Collateral Credits. The present invention is described in terms of the above example. This is for convenience only and is not intended to limit the application of the present invention. In fact, after reading the following description, it will be apparent to one skilled in the relevant art(s) how to implement the following invention in alternative embodiments (e.g., futures exchanges as well as OTC markets).

The terms "participant," "user," "company," and "party" are used interchangeably throughout herein to refer to those who would access, use, or benefit from the collateral management operations of the present invention.

Further, from the perspective of the CMS provider of the present invention, the term "portfolio" or "net portfolio" as used herein refers to the collection of all the trades a particular (single) party has with all of the other participants (i.e., counterparties) within the CMS. The term "sub-portfolio" as used herein, however, refers to a party's collection of trades with a specific participant (i.e., counterparty) within the CMS system.

II. System Architecture

Figure 5:
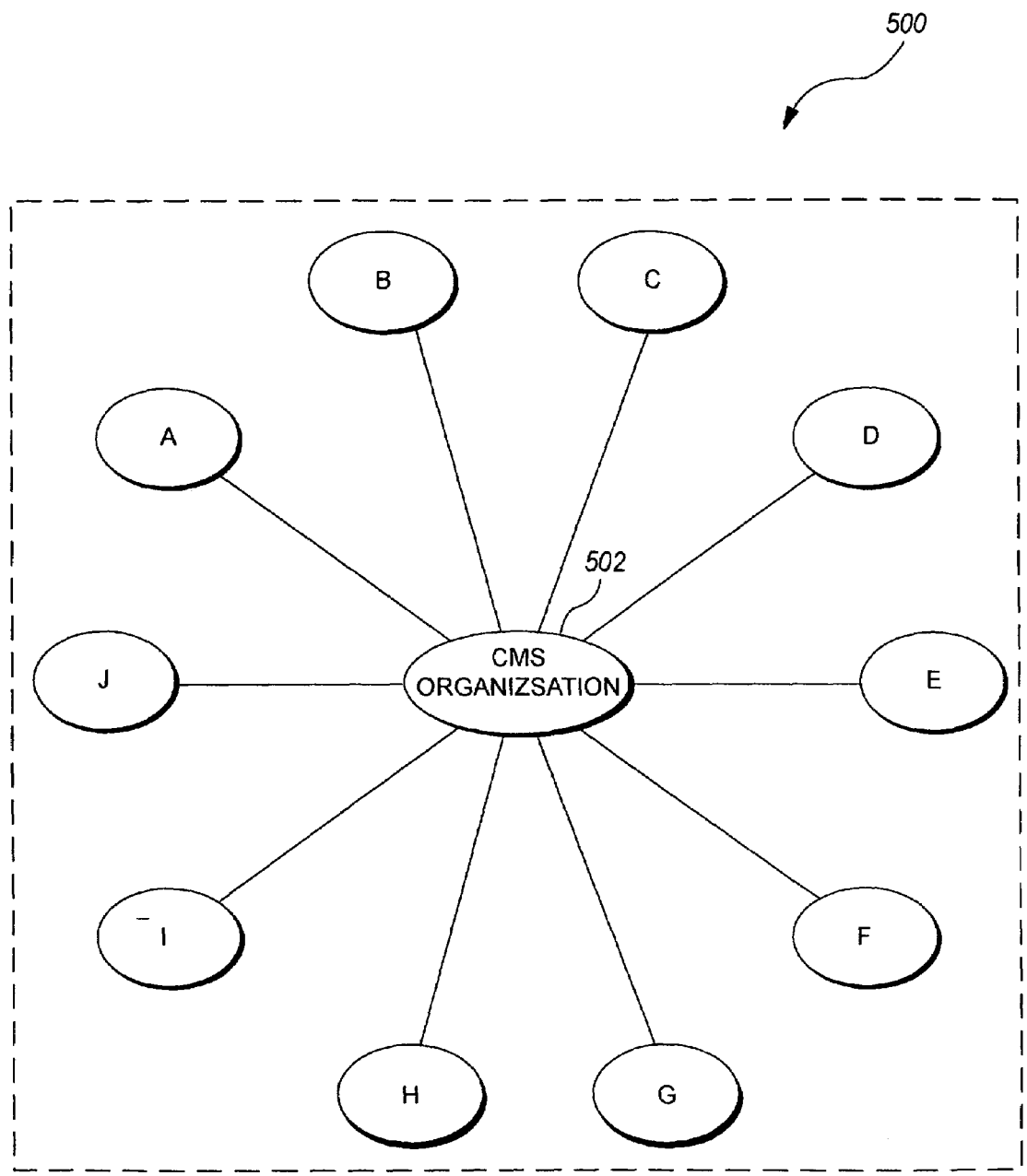
FIG. 5 is a block diagram illustrating a complete collateral management system according to an embodiment of the present invention.

Referring to FIG. 5, a block diagram illustrating a complete collateral management system (CMS) 500 according to an embodiment of the present invention is shown. The CMS 500 includes a CMS provider 502 which is an entity that provides a centralized collateral management system to a plurality of users (e.g., companies A–J), in contrast to network 100 (as shown in FIG. 1B) which does not have a centralized collateral management. It is assumed, for simplicity herein, that the CMS provider and the users (A–J) have an infrastructure to communicate in via a telecommunications network, computer network, or other electronic network (e.g., the Internet, Society for World-wide Interbank Financial Telecommunication (SWIFT) network, etc.).

While one CMS provider 502 is shown in FIG. 5, it will be apparent to one skilled in the relevant art(s), as explained below, that CMS 500 can include a plurality of CMS providers 502 linked in a hierarchical or network fashion for distributed operations.

Each user (A–J) of the CMS 500 supplies information about its trade activities with each of the other users on the system to the CMS provider 502. The users of the system can be, but are not limited to, divisions of companies, companies, exchanges, and/or the like. The CMS provider 502 has access to all MTM collateral, regardless of type, posted to a company. The CMS provider may issue Collateral Credits equal to the value of the MTM collateral posted to a company. The CMS provider 502 can also calculate the potential loss exposure that a company faces on its entire portfolio to determine anticipatory collateral. The CMS provider 502 can then issue Collateral Credits for anticipatory collateral as explained in detail below.

III. System Operation Overview

Figure 3:
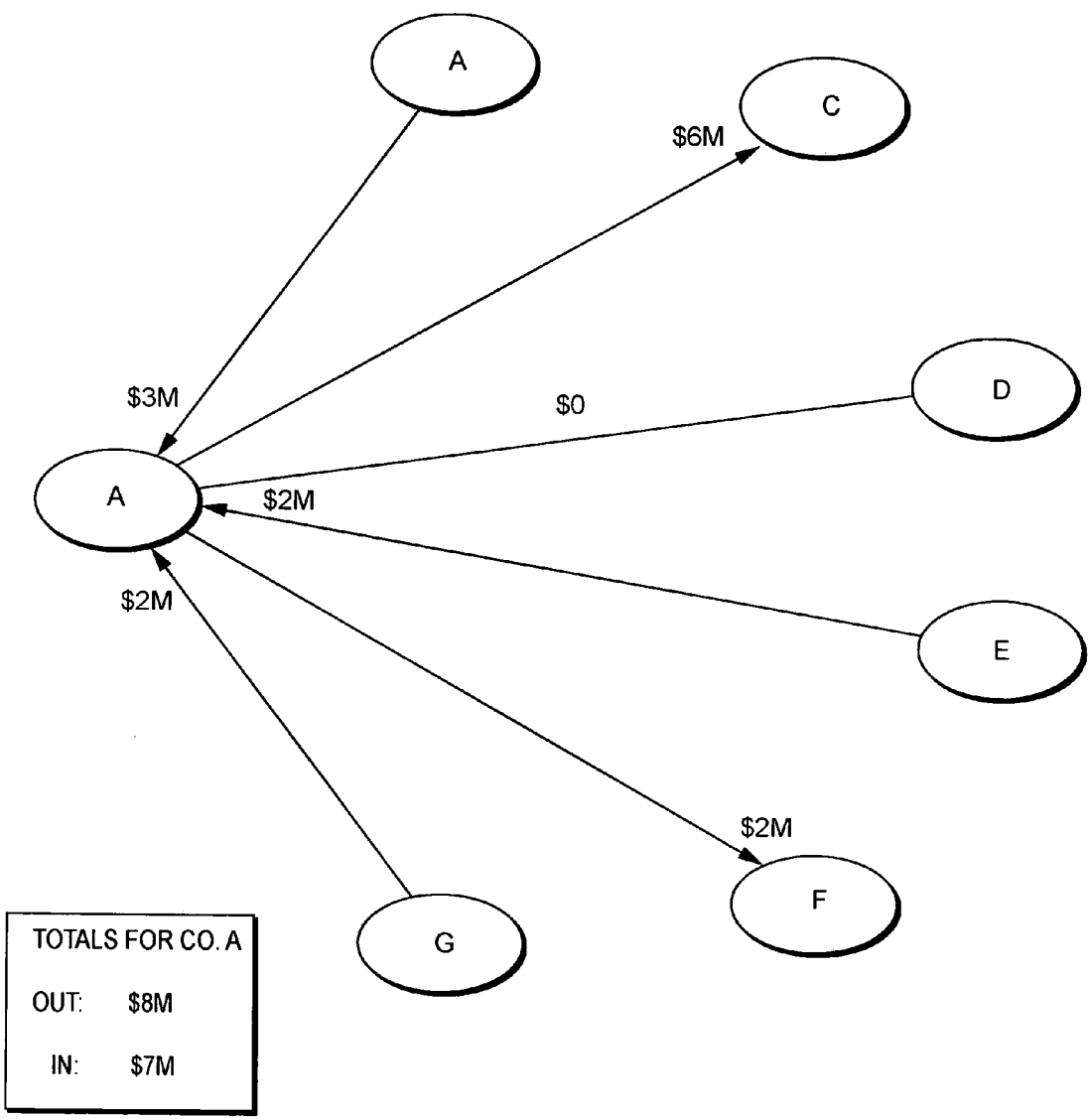
FIG. 3 is a block diagram illustrating conventional mark to market collateral postings for a single network participant.
Figure 4:
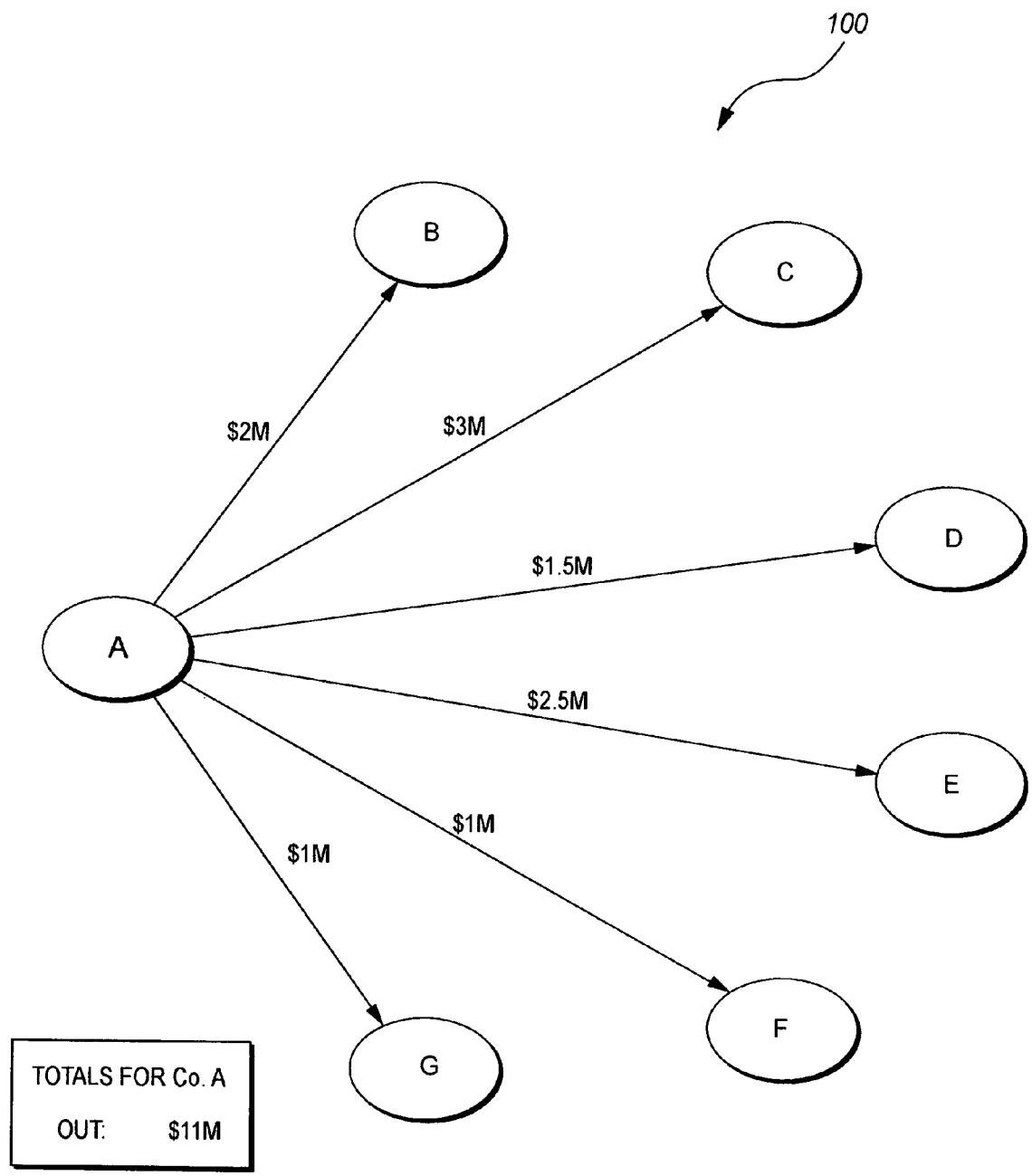
FIG. 4 is a block diagram illustrating conventional anticipatory collateral postings for a single network participant.
Figure 6:
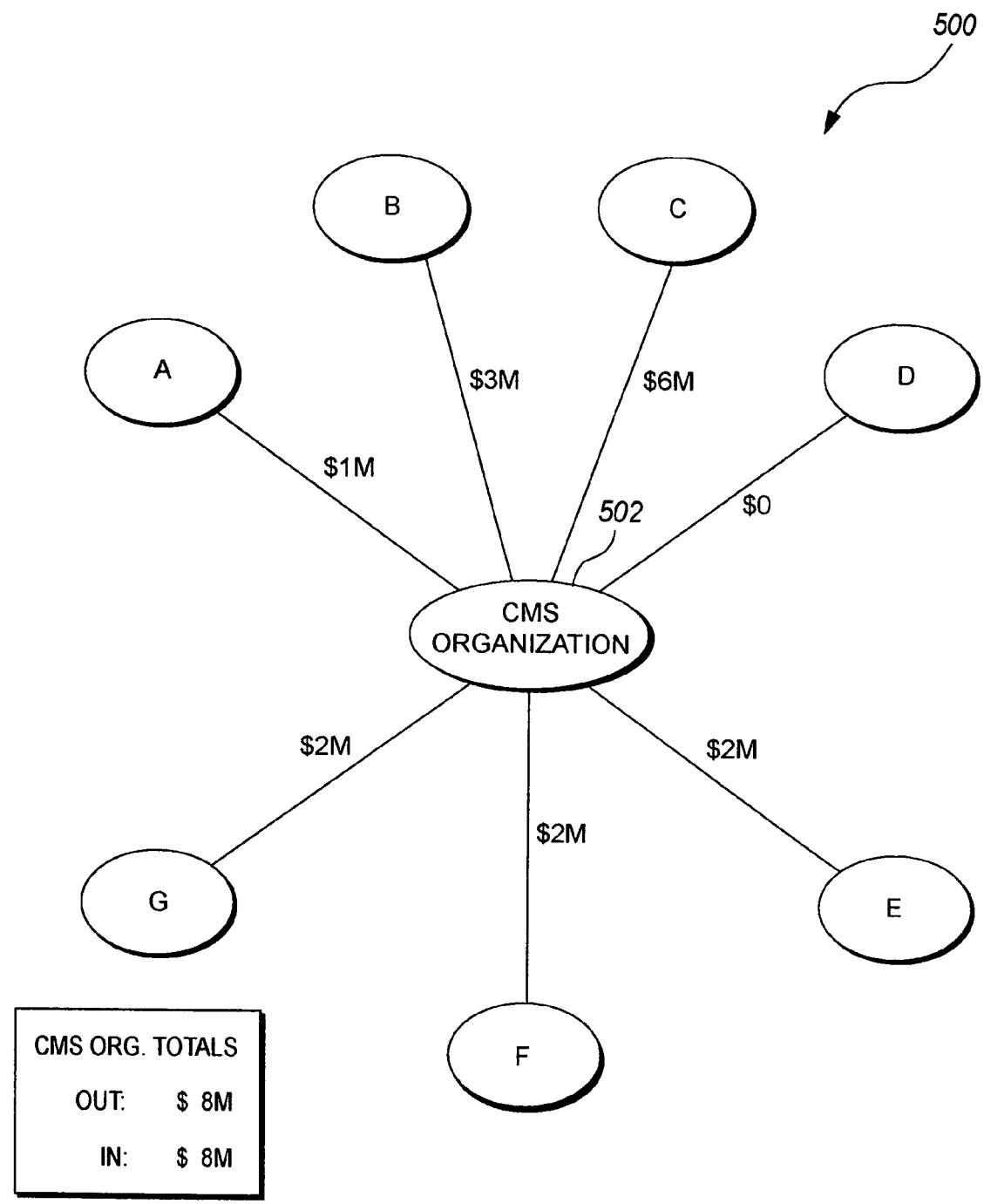
FIG. 6 is a block diagram illustrating mark to market collateral postings for collateral management system users according to an embodiment of the present invention.
Figure 7:
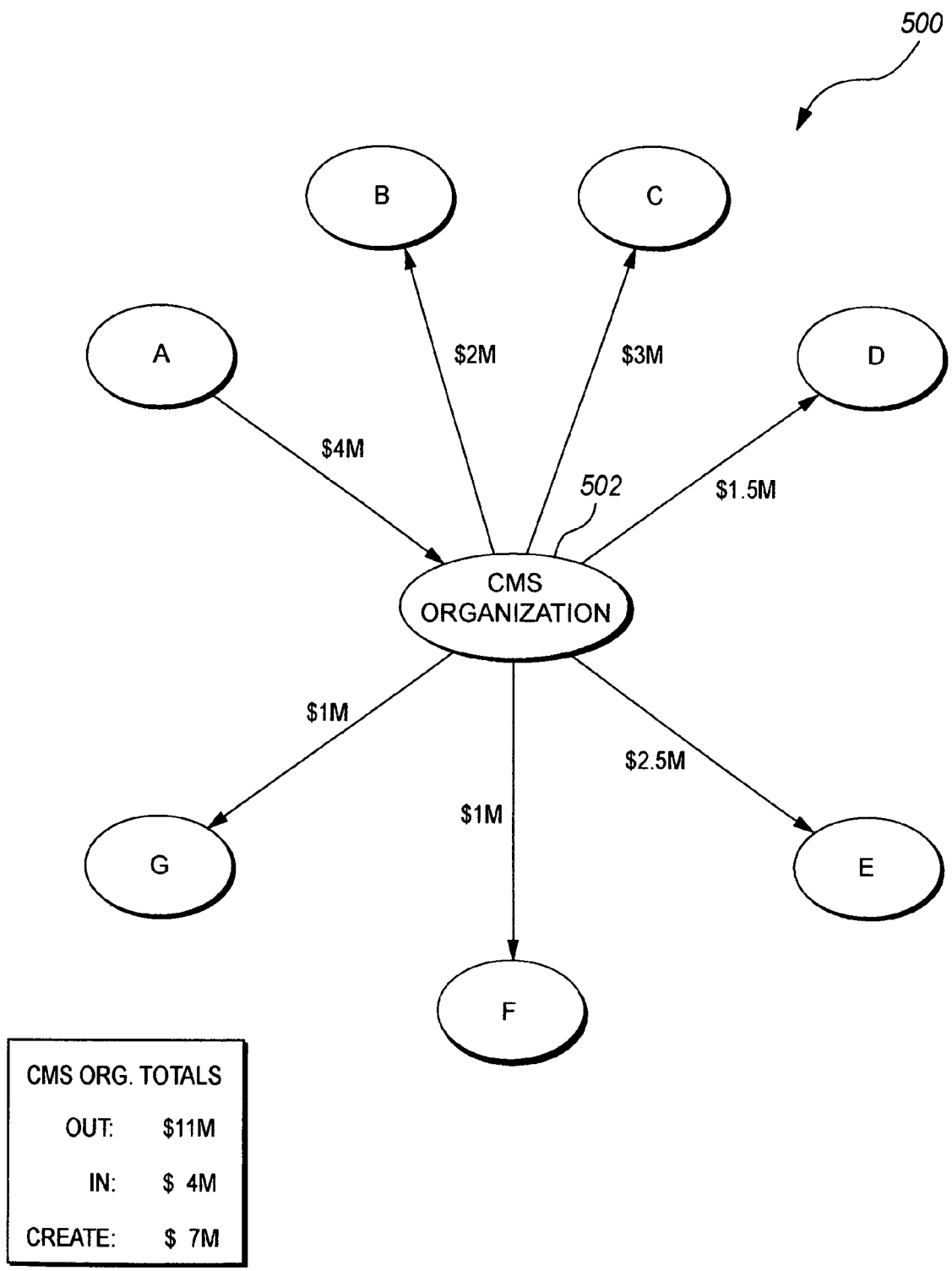
FIG. 7 is a block diagram illustrating anticipatory collateral postings for collateral management system users according to an embodiment of the present invention.

Applying the CMS 500 of the present invention to the example transactions of FIG. 3 and FIG. 4, generates the resulting collateral networks shown in FIG. 6 and FIG. 7, respectively. That is, in FIG. 6 a block diagram illustrating MTM collateral postings for CMS 500 users according to an embodiment of the present invention is shown. Further, referring to FIG. 7, a block diagram illustrating anticipatory collateral postings for CMS 500 users according to an embodiment of the present invention is shown.

In the example of FIG. 6 and FIG. 7, Company A puts up a total of $5 M of collateral, which is significantly lower than the sum of its previous bilateral requirements of $19 M (as seen in FIG. 3 and FIG. 4). The $5 M sum is equivalent to its net MTM loss position of $1 M (as shown in FIG. 6) and its total portfolio Value at Risk (anticipatory collateral) of $4 M (as shown in FIG. 7). Company A has used $7 M in "MTM Collateral Credits." Company A had these credits because of its MTM gains from companies B, E, and G. Company A can then use these credits to cover MTM collateral payments to C and F. The CMS provider 502 also issues $7 M in "Anticipatory Collateral Credits" which are used with the additional $4 M of anticipatory collateral to cover the anticipatory collateral that B, C, D, E, F and G require. Alternatively, if Company A had been a net receiver of MTM collateral then they could have used MTM Collateral Credits to meet their anticipatory collateral requirements.

If Company A defaults in this situation and owes Company F $3.5 M and Company C $9 M, the CMS provider 502 would provide Company F with $3 M ($2 M of MTM collateral and $1 M of anticipatory collateral) and Company C with $9 M ($6 M of MTM collateral and $3 M of anticipatory collateral). These payments represent only the guaranteed amounts. In this case, Company F would then have to resort to other measures to obtain the remaining $0.5 M owed to it by Company A.

As FIG. 6 and FIG. 7 suggest, the present invention does not require all entities to be "members" of the CMS 500 trading group. Instead, individual member entities can ask the CMS provider 502 to hold collateral, including Collateral Credits, for each of its counterparties (including non-members). In this way, the users can take advantage of the diversification benefits of their entire portfolio without revealing their positions to any of their counterparties. The CMS provider 502 can then elect to carry the remaining risk or to hedge the risk using some form of insurance.

IV. Detailed Example of System Operation

To best explain the features and advantages of the present invention, including how the CMS 500 expands anticipatory collateral through the dynamic management of risks, it is best to juxtapose it to conventional collateral management system processes that can be used by a clearinghouse for a futures exchange or by other collateral services.

A. Conventional Collateral Management System Processes

Figure 1B:
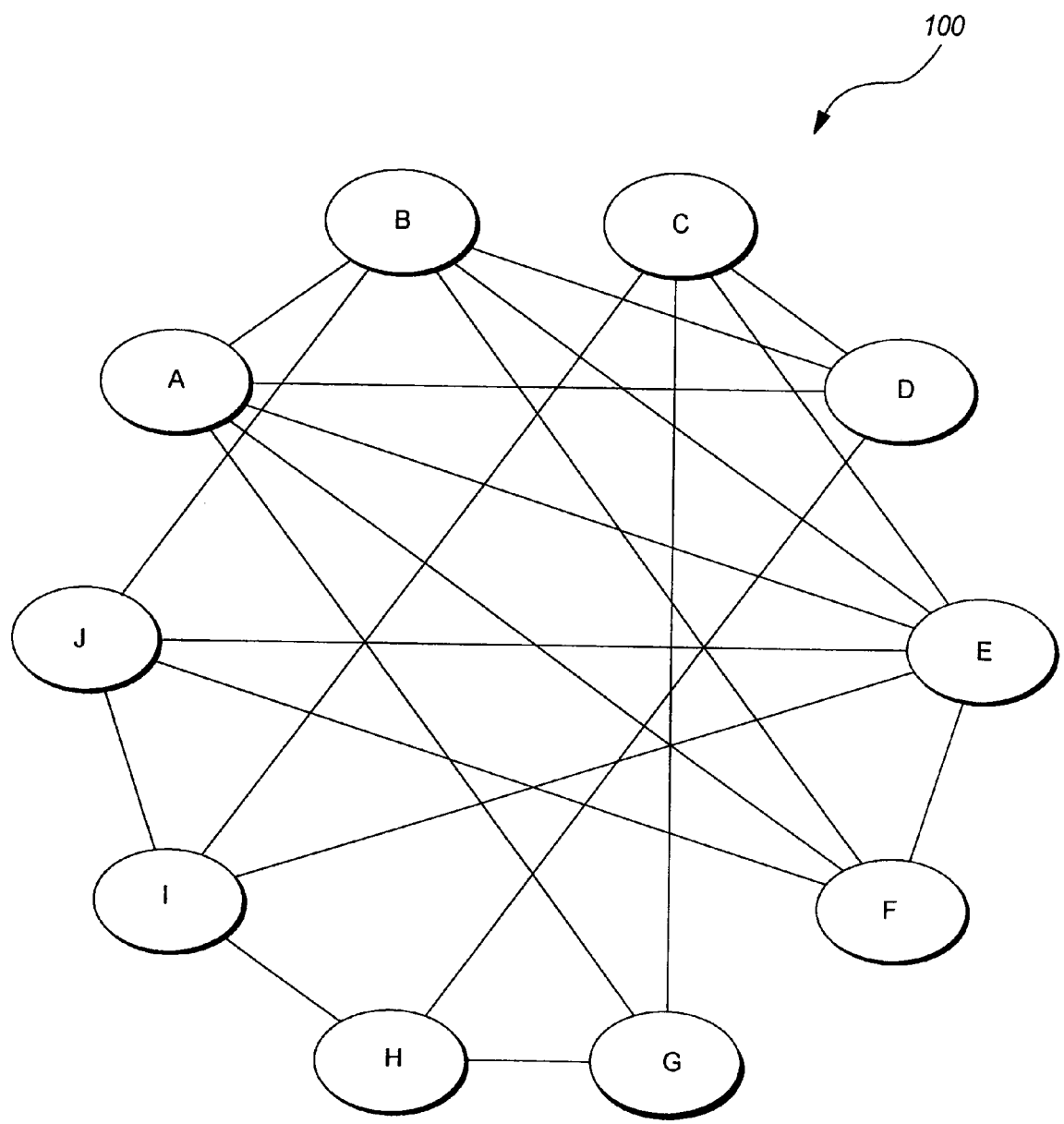
FIG. 1B is a block diagram illustrating a complete over the counter network of obligations from the perspective of multiple participants.
Figure 2:
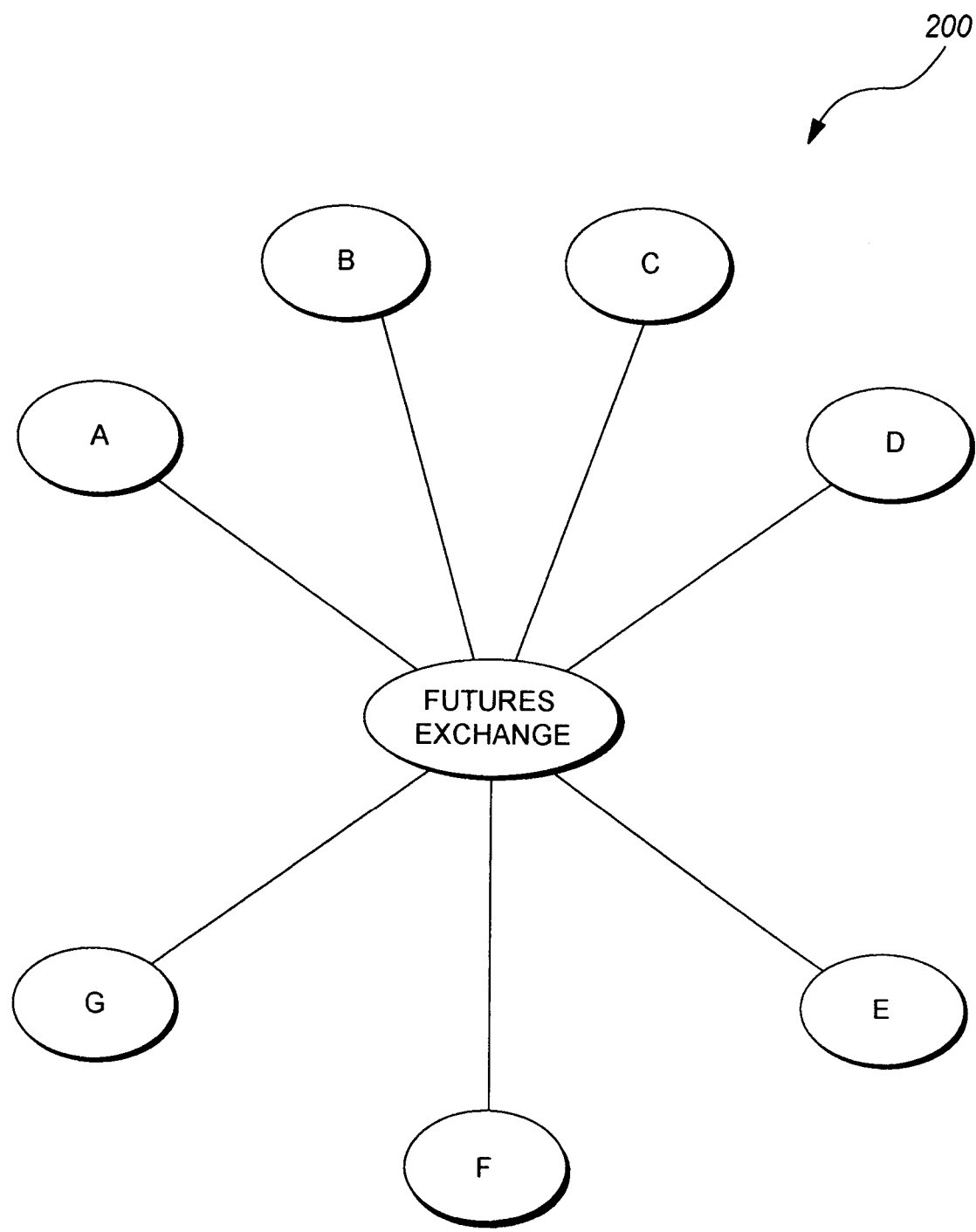
FIG. 2 is a block diagram illustrating a typical futures exchange network.
Figure 8:
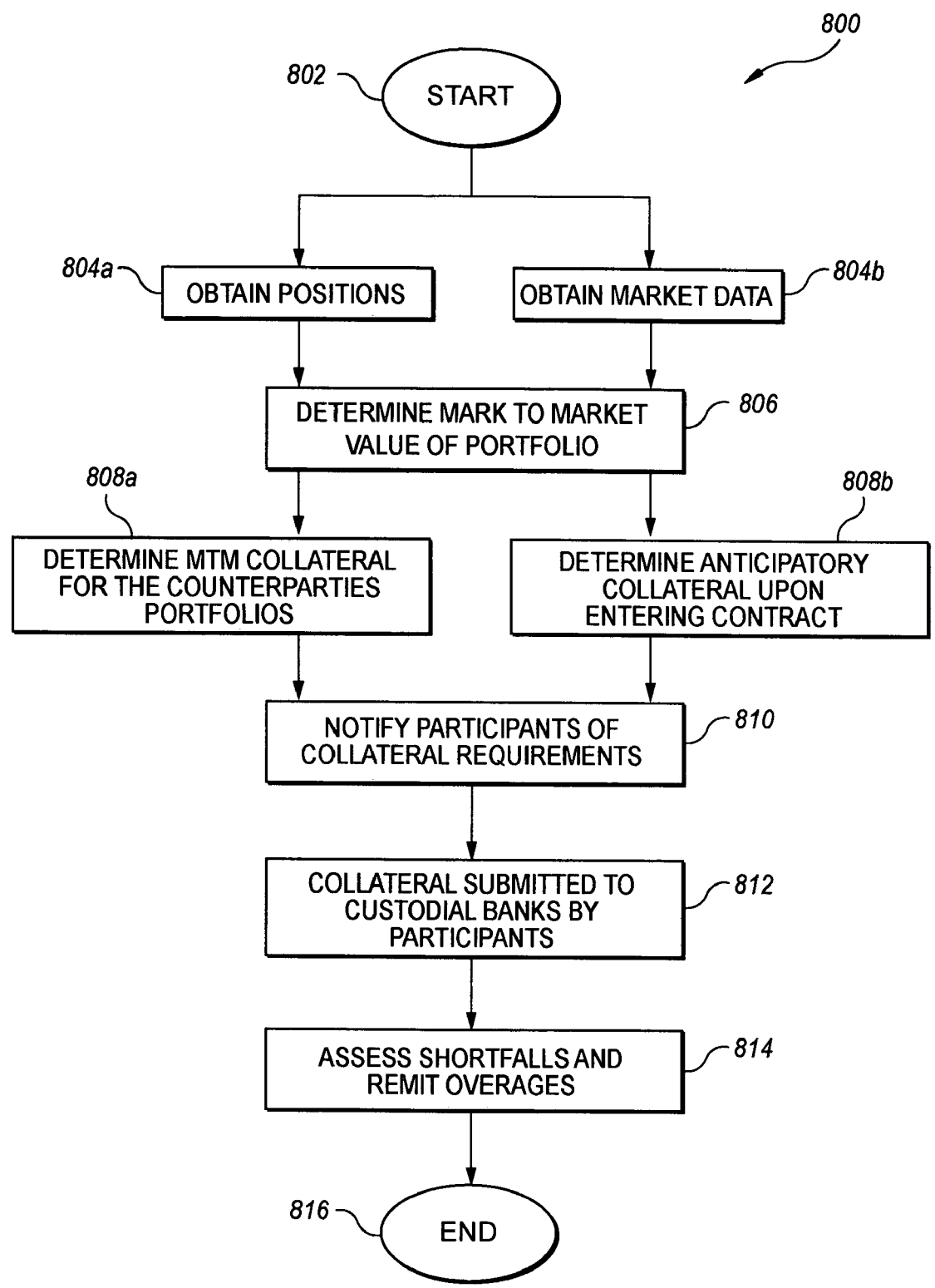
FIG. 8 is a flowchart representing the conventional collateral management process for a network of obligations.

Referring to FIG. 8, a flowchart representing the conventional collateral management process 800 that can be in place between two counterparties (i.e., one line in network 100 as shown in FIGS. 1A–B) is shown. That is, the standard method used between any two counterparties with netting and collateral agreements is shown. Collateral management process 800 depicts collateral determination for a sub-portfolio between a party-counterparty pair. Collateral management process 800 begins at step 802 with control passing immediately to step 804a. In step 804a, system 800 obtains the trading positions of the participants (i.e., party and counterparty). These positions can include, but are not limited to, forwards, options (American, European, Asian, barrier, puts, calls, and/or exotics), futures, swaps, and accounts receivable.

In step 804b, appropriate data is also obtained to allow accurate pricing of any of the above products. Necessary data can include, but are not limited to, spot prices, forward price curves, price spreads, spot volatility, forward volatility curve, volatility smile structure, forward correlations between assets, and interest rate curves.

In step 806, the portfolio's MTM value is determined for each participant. This determination is made by valuing each of the assets in the respective portfolios under current market information. Various methods exist to determine the appropriate value of a specific type of asset. A broad range of pricing methodologies are detailed in Hull, John, *Options, Futures, and Other Derivative Securities*, Third Edition, Prentice Hall (Englewood Cliffs, N.J.), 1997, ISBN 0138874980, and Wilmot, Paul, *Option Pricing: Mathematical Models and Computations*, American Educational Systems, 1998, ISBN 0952208202, which are both incorporated herein by reference in their entirety. The new MTM value of the portfolio is simply the sum of the current valuations of each of the individual assets that make up the portfolio.

After calculating the net portfolio MTM, the MTM collateral can be determined in step 808a. (Note: this may not be the entire portfolio of either counterparty, but may only be the sub-portfolio that contains the positions between the two entities.) The MTM collateral obligation, as is well known in the relevant art(s), is equivalent to any net loss that might be realized on the portfolio since the last MTM valuation. In step 808b, anticipatory collateral—known as "initial margin" or "performance bonds" on futures exchanges—is calculated upon entering the position. Then, in step 810, the participants are notified of their (MTM and anticipatory) collateral requirements for the trade. In step 812, the participants submit the required collateral (as determined in step 810) to one or more custodians (e.g., banks or similar entities). In step 814, after all collateral has been transferred to the various custodians to meet the necessary requirements, the net account balance is determined. If a participant has excess collateral they can remove it, or if a shortage remains they must either supply the required collateral or be considered in default. Collateral management process 800 is thus complete for the pair as indicated by step 816. This process is then repeated for each trading pair within the network 100 to determine total collateral obligations.

This is the basic system used by exchange clearinghouses and some collateral management services. Examples of such services include the SPAN methodology operated by the Chicago Mercantile Exchange (CME), a description of which is available from URL: http://www.cme.com/span/index.html which is incorporated herein by reference in its entirety. Another example includes the National Securities Clearing Corporation (NSCC), a description of which is available from URL: http://www.nscc.com which is incorporated herein by reference in its entirety. These systems become the counterparty to each user on the system. This process means that the clearinghouse is accepting the residual credit risk of default. In practice, this risk is usually mutualized between and among all clearinghouse members.

A clearinghouse may settle positions that derive from exchange trading or, as in the NSCC system, it may also manage collateral for positions arising from over the counter trades. SwapClear, a service of the London Clearing House, a description of which is available from URL: http://www.lch.co.uk, which is incorporated herein by reference in its entirety, does this for swap trades between its members. The NSCC does this for transactions related to securities such as stocks and government bonds.

An alternative embodiment of collateral management system 800 is one in which steps 800–810 are done for each trading pair within the system and then, as long as both parties have agreed that rehypothecation is acceptable, any party receiving collateral can re-use it and post it as collateral for their own positions. The rehypothecation process is well known by those skilled in the relevant art(s) and was present in the Global Credit Support System (GCSS) previously offered by Cedel Bank, New York, a description of which can be found in U.S. Pat. No. 5,802,499, which is incorporated herein by reference in its entirety. The rehypothecation process was also suggested in a plan put forward by the CME, and described in Chicago Mercantile Exchange, *CME Swaps Collateral Depository Report*, April 1995, which is incorporated herein by reference in its entirety. Rehypothecation is most easily accomplished with collateral of cash and government securities. Even though the CMS 500 is not the counterparty to every trade—unlike an exchange—rehypothecation of collateral allows users to decrease the amount of collateral that they must post.

B. Present Invention's CMS

Having described the conventional collateral management process with reference to FIG. 8 above, the enhancements and resulting advantages of the CMS 500 of the present invention can now be illustrated.

Figure 9:
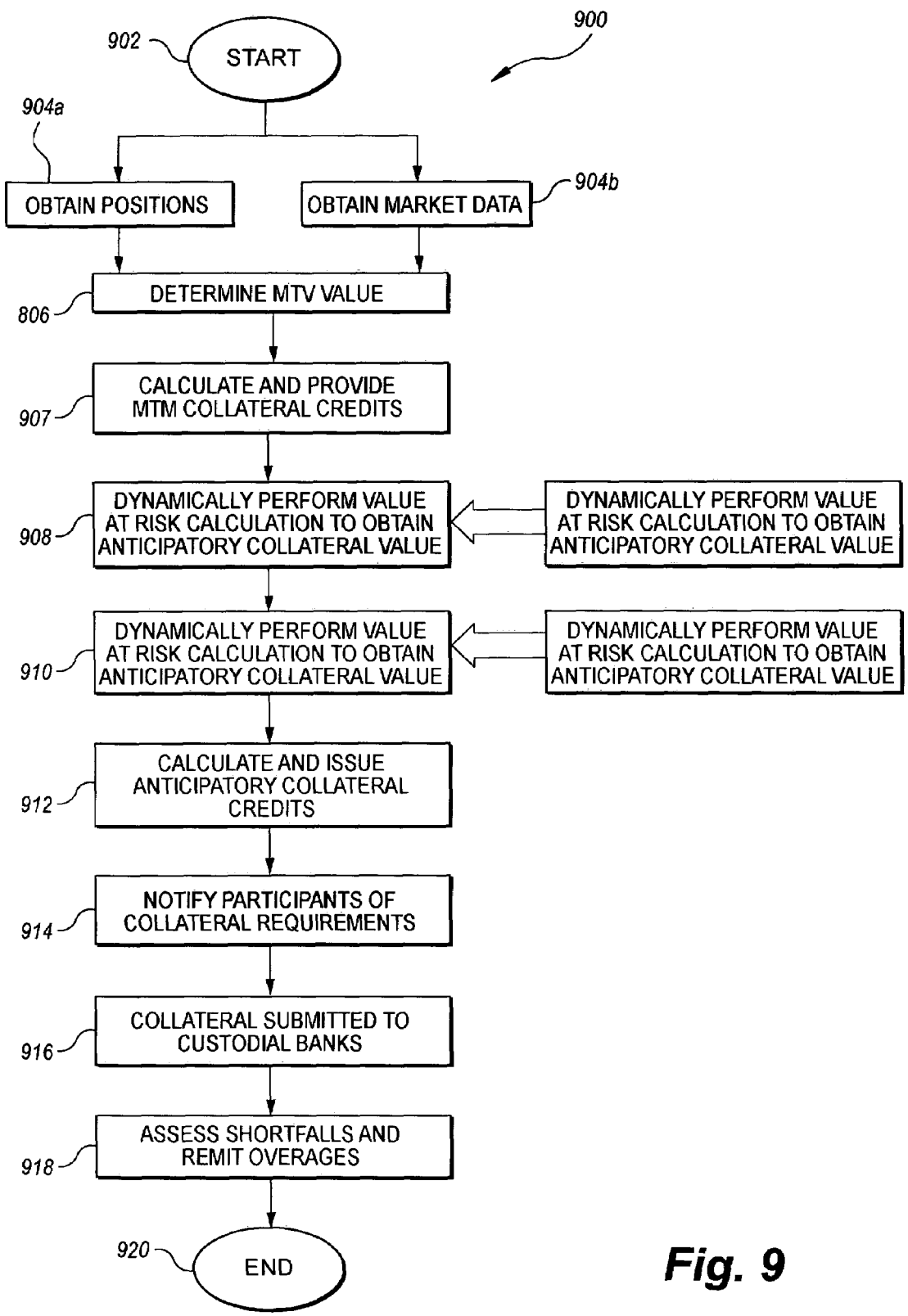
FIG. 9 is a flowchart representing a collateral management process for a network of obligations according to an embodiment of the present invention.

Referring to FIG. 9, a flowchart representing a collateral management process 900 for CMS 500, according to an embodiment of the present invention, is shown for a party-counterparty pair. The collateral management process 900 of the present invention begins at step 902 with control passing immediately to step 904.

In steps 904a and 904b, process 900 obtains the trading positions of each of the participants' sub-portfolios and appropriate data to allow accurate pricing of these positions as described with respect to steps 804a and 804b of FIG. 8, respectively.

In step 906, similar to step 806 of FIG. 8, each of the sub-portfolios' MTM value is determined. This determination is made by valuing each of the assets in the respective sub-portfolios under current market information. In an alternative embodiment of the invention, the MTM value of each sub-portfolio can be reported directly to the CMS 500. This alternative embodiment would obviate the need to perform steps 904–906.

The CMS 500 allows current practice to expand by allowing, where legal, simultaneous netting of positions across products and across instruments for all positions with a given counterparty. Product netting implies allowing a company to net positions on different asset types, for example oil and natural gas. Instrument netting allows a company to net positions between different types of trading instruments, for example forwards and swaps.

In step 907, the CMS 500 calculates and provides MTM Collateral Credits to each company. These credits are issued whenever a company has realized a net profit from a counterparty. These credits allow unrealized position profits to be used as collateral. The value of the MTM Collateral Credit is based on the net value of each company's sub-portfolio. If a company is in a net positive mark to market position then MTM Collateral Credits may be granted to a value up to the mark to market value. The total value of the MTM Collateral Credits issued by the CMS provider 502 to a company j is given by EQUATION (1):

$$\text{Total MTM Collateral Credits}_j = \sum_{i=1}^{N} \max\{MTM_{ji}, 0\} \quad (1)$$

In EQUATION (1), $MTM_{ji}$ is the mark to market value for company j's position with each company i, and N is the total number of companies with whom company j has trades (and thus, the total number of sub-portfolios).

In step 908, a dynamic Value at Risk calculation is performed to obtain the appropriate anticipatory collateral for each of the participants' sub-portfolio. As mentioned above, Value at Risk measures provide a good starting estimate of appropriate anticipatory collateral. There are three standard methodologies for calculating Value at Risk: variance/covariance, historical, and Monte Carlo as discussed in the above-cited Jorion, *Value at Risk: The New Benchmark for Controlling Market Risk and Riskmetrics Technical Document*. As suggested in FIG. 9, using the well-known methodologies described in these references, one skilled in the relevant art(s) can calculate an appropriate Value at Risk for a portfolio of positions.

The particular methodology chosen by one skilled in the relevant art(s) would depend on several factors including, but not limited to, the underlying assets involved (e.g., electricity futures, oil contracts, etc.), time, complexity, data availability, and even the preference of the CMS provider 502. In fact, better methods than those listed in step 908 and mentioned above can be later developed and used while not altering the operation of the present invention.

Currently, anticipatory collateral, if used, is calculated upon entering the position. This ignores the fact that risks can change over the life of a position. Ideally, anticipatory collateral should be calculated dynamically (i.e., repeatedly over the life of the position). The size of the required anticipatory collateral should be directly linked to the exposure and risk of a position. This is achieved by the present invention's dynamic calculation. The anticipatory collateral calculation can be performed at any pre-selected time interval (e.g., daily, weekly, monthly, or any other CMS provider-selected interval value).

One shortcoming of the Value at Risk as anticipatory collateral calculation is that, although the return distribution can be approximated by a normal distribution, the true distribution is often leptokurtotic (i.e., has a greater than normal chance of extreme movements) and therefore there can be significant residual risk that the normal assumption does not capture. For this reason, as will be apparent to those skilled in the relevant art(s), other refinements of the anticipatory collateral calculation can be made through the use of fundamental models, scenario testing and stress testing as shown in step 910.

Before moving to step 912, it will be apparent to one skilled in the relevant art(s) (and thus, not shown in FIG. 9) that the MTM valuation and anticipatory collateral calculations (of steps 906–910) for each participant's sub-portfolio will allow the CMS provider 502 to obtain those values on a net portfolio basis. As mentioned above, each participant's net portfolio is simply the collection of all the market positions in all their sub-portfolios.

Consequently, in step 912, Anticipatory Collateral Credits are issued which represent a guarantee provided by the CMS provider 502 based on the analysis of each participant's net (total) portfolio within the CMS 500. If a company defaults, the CMS provider 502 will provide funds to the counterparty equal to the value of the Anticipatory Collateral Credit. This allows each counterparty to receive the desired amount of anticipatory collateral, while each company in the trading group must provide only anticipatory collateral on the total portfolio. Thus, all diversification and hedge positions are taken advantage of without revealing each user's trading sub-portfolio to (actual or perceived) competitors.

In step 914, as in step 810 of FIG. 8, the CMS provider 502 would then notify each participant of the required MTM collateral associated with its positions (calculated as in step 808a of FIG. 8 but not shown in FIG. 9), as well as the required anticipatory collateral and the value of all Collateral Credits issued. Within the CMS 500, each individual counterparty MTM loss is fully collateralized either with collateral posted by the company or through MTM Collateral Credits arising from gains in other parts of the portfolio which are themselves fully collateralized.

In addition, some companies may rehypothecate some portion of the collateral that was posted to them. If the company elects to do this, they will then return issued MTM Collateral Credits to the CMS 500 of equivalent value. In step 916, as in step 812 of FIG. 8, each company must then provide collateral to meet the above-identified collateral requirements. Historically, collateral has been supplied for financial obligations primarily in the form of cash and securities. By using Collateral Credits, the present invention expands the types of collateral that can be used between companies. Collateral Credits have the advantage of being perfectly divisible and their use exactly mimics a system with full rehypothecation of all collateral. Allowable collateral types include, for example, cash, securities, letters of credit, parent guarantees, self guarantees, and Collateral Credits. Letters of credit and parent guarantees are well-known forms of collateral in the bilateral marketplace. Self guarantees are similar but based upon the underlying value of a company's assets or its credit rating.

In step 918, similar to step 814 of FIG. 8, after all collateral has been transferred to the various custodians or transferred within participants account(s) maintained by a custodian to meet necessary requirements, the net account balance is determined. If the company has excess collateral they can remove it, or, if a shortage remains, they must either supply the required collateral or be considered in default.

By providing a centralized repository of collateral information and Collateral Credits, the present invention allows non-standard collateral types to effectively be reused within the CMS 500 system. In the event of a default, all companies settle with the defaulting party by payment into and withdrawal from the CMS provider 502. This settlement methodology allows for the use of rehypothecated collateral and Collateral Credits without actually removing it from the CMS 500. Such a system duplicates netting across counterparties, which allows a company to deal with collateral on a net portfolio basis as opposed to a dealing with collateral on a number of sub-portfolios, each consisting of positions with a specific counterparty. In addition, if futures exchanges are present on the CMS 500, a company would be able to net OTC positions with their futures positions. The collateral management process 900 for CMS 500 is thus complete as indicated by step 920.

C. Detailed Anticipatory Collateral Calculations

The variance-covariance Value at Risk methodology to calculate anticipatory collateral (step 908), according to an embodiment of the present invention, is presented. This highlights the features and advantages of the present invention, including how the CMS 500 expands anticipatory collateral through the dynamic management of risks.

To appropriately determine the size of the anticipatory collateral, the potential exposure of the position must be identified. A standard method of doing this is to use the statistical measure of standard deviation, a, which measures the average distribution around a mean. One equation used to calculate standard deviation from past data is EQUATION (2):

$$\sigma = \sqrt{\frac{1}{n}\sum_{i=1}^{N}\left(\frac{\Delta P_i}{P_i}\right)^2} \qquad (2)$$

In EQUATION (2), n is the number of observations and $\Delta P_i$ is the change in price level at period i. This form of the standard deviation calculation assumes an underlying random walk process without drift.

Given the standard deviation of the value of an asset, the potential loss exposure can be calculated. This potential exposure can then be used to determine an appropriate level of anticipatory collateral. A standard assumption is that the price changes are normally distributed. In statistical notation, this is expressed as shown in EQUATION (3):

$$\frac{\Delta P}{P} \sim N(0, \sigma^2) \qquad (3)$$

EQUATION (3) states that the price changes, $\Delta P$, are distributed normally, $\sim N$, with a mean of zero (0) and a variance of $\sigma^2$. The variance of a series is equal to the squared standard deviation.

The properties of a normal distribution are well understood and it is therefore possible to determine an appropriate level of anticipatory collateral to cover potential risks of a position. The appropriate anticipatory collateral (AC) level can be calculated using EQUATION (4):

$$AC = P*\sigma*N'(CI) \qquad (4)$$

In EQUATION (4), P is the value of the portfolio (i.e., the sum of the MTM value of each asset within the portfolio), $\sigma$ is the volatility of the portfolio as explained in detail below, N'( ), represents the inverse normal probability distribution, and CI represents a pre-selected confidence interval. In general, the N'(CI) is between 1.65 and 3 representing confidence intervals of 95% to 99%.

In reality, each user (i.e., company) will have a portfolio of positions, and the correct amount of calculated anticipatory collateral should consider the risk of the entire portfolio, not just each individual position. Anticipatory collateral must therefore take into account the benefits of diversification.

As mentioned above, diversification describes the principle of how risk tends to be reduced as more assets are held in a portfolio. This is the true because a portfolio made up of the combination of two different risky assets will generally be less risky than a portfolio that includes only one risky asset. To further explain diversification, consider two assets, X and Y, that are both normally distributed as expressed in EQUATIONS (5) and (6), respectively:

$$X \sim N(0, \sigma^2) \qquad (5)$$

$$Y \sim N(0, \phi^2) \qquad (6)$$

Now consider the option of investing some value, V, into X or Y. If this investment is made it is easy to see that the volatility of this investment would be either $\sigma$ or $\phi$ depending on which asset it was invested in. Now, instead of placing the whole value into one or the other, we decide to invest a percentage, p, of V into X and (1−p) into Y. The value of the investment remains the same, but the variance would be given by EQUATION (7):

$$\text{variance } (pX+(1-p)Y) = \{p^2\sigma^2+(1-p)^2\phi^2+2p(1-p)\rho\sigma\} \qquad (7)$$

In EQUATION (7), $\rho$ represents the correlation between X and Y. Correlation defines the joint distribution between two stochastic variables and has a value between −1.0 and 1.0. A correlation of zero (0) implies that the two variables are independent—a movement in one will have no effect on the movement of the other. A correlation of 1.0 implies perfect correlation in which case the combination of the two parameters will be the equivalent to a straight summation of risk and no diversification benefits are obtained. For any correlation parameter less than 1.0, diversification is obtained.

For a portfolio of multiple assets the total volatility can be calculated by using EQUATIONS (8) and (9):

$$\sigma_P = \sqrt{\sum_{j=1}^{N} \sum_{i=1}^{N} w_i w_j \sigma_i \sigma_j \rho_{ij}} \qquad (8)$$

$$w_i = \frac{v_i}{\sum_{j=1}^{N} v_j} \qquad (9)$$

In EQUATIONS (8) and (9), V represents the asset value, w is the weight of the asset in the total portfolio, and N is the total number of collateral assets in the portfolio.

The present invention's process differs from other anticipatory collateral systems by providing dynamic management of collateral for the OTC market. Using the above-described methodology, the CMS provider 502 calculates appropriate anticipatory collateral for the sub-portfolio of trades with each counterparty in step 908. The sub-portfolio, in contrast to the entire portfolio to calculations, represents the amount of anticipatory collateral that each counterparty believes is necessary to protect its trades with a specific counterparty. This ignores any hedges, offsets, or diversification benefits arising from trades with other counterparties. The value of Anticipatory Collateral Credits given by the CMS provider 502 to a company j (calculated in step 912) is given by EQUATION (10):

$$\text{Value of Anticipatory Collateral Credits}_j = \sum_{i=1}^{N} AC_{ji} - AC_{jP} \qquad (10)$$

In EQUATION (10), $AC_{jp}$ is the required anticipatory collateral for the entire portfolio of company j, $AC_{ji}$ is the required anticipatory collateral for the sub-portfolio of trades that company j has with each company i, and N is the total number of companies with whom company j has trades (and thus, the total number of sub-portfolios).

More specifically, $AC_{ji}$ is obtained by using EQUATION (4) and inputting the volatility of each sub-portfolio, $\sigma_{sub-p}$, obtained by using EQUATIONS (8) and (9). Similarly, $AC_{jp}$ is obtained by using EQUATION (4) and inputting the volatility of the net portfolio, $\sigma_p$. The CMS provider 502 can then choose to accept the residual default risk or to insure it.

D. Use of Expanded Collateral with the CMS

The CMS 500 also expands the collateral concept through the dynamic management of credit risks and the creation of Collateral Credits.

Figure 10:
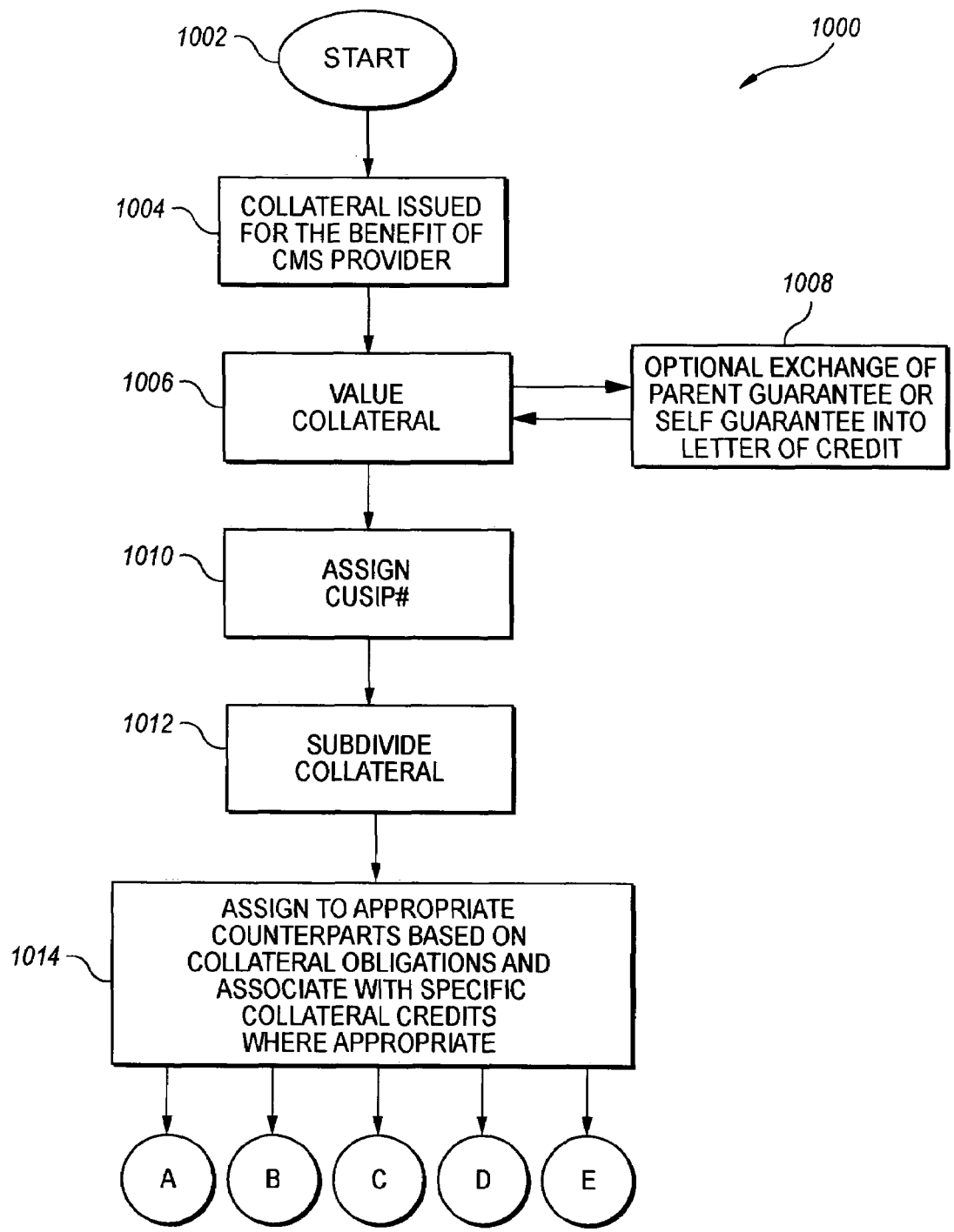
FIG. 10 is a flowchart illustrating the use of expanded collateral within a collateral management system according to an embodiment of the present invention.

Referring to FIG. 10, a flowchart 1000 illustrating the use of expanded collateral within the CMS 500 (during steps 912–918) is shown. Flowchart 1000 begins at step 1002 with control passing immediately to steps 1004. In step 1004, all collateral is issued for the benefit of the CMS provider 502 (see step 916 of FIG. 9). This allows the CMS provider 502 to allocate the collateral on an appropriate basis and to easily shift collateral obligations without actual collateral movement.

In step 1006, the CMS provider 502 values all collateral. In step 1008, parent guarantees and self guarantees can be limited in the CMS 500 or discounted in value. To prevent this, a company has the right to have its collateral trans- formed through syndication or some other means into another collateral type that may be valued more highly in the CMS 500.

In step 1010, The CMS provider 502 then assigns a Committee on Uniform Securities Identification Procedures (CUSIP) number to all pledged collateral. This allows each piece of collateral, in step 1012, to be easily parsed into smaller components which support individual Collateral Credits and tracked through the CMS 500. In step 1014, the collateral is then assigned based on the rules of the CMS 500 and the collateral demands resulting from the collateral management process 900.

E. Extensions to Basic Trading Model

Figure 11:
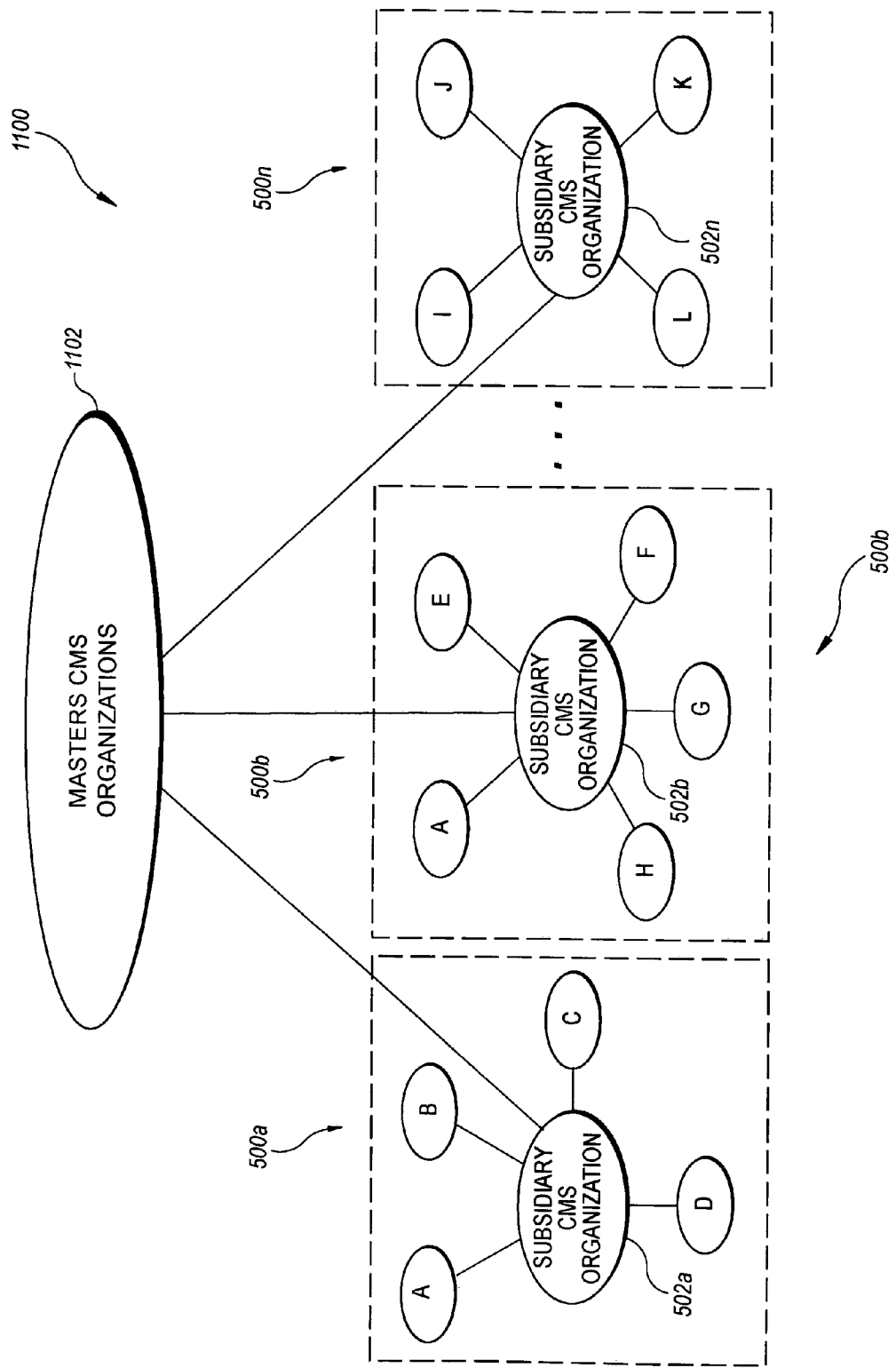
FIG. 11 is a block diagram illustrating a complete hierarchical collateral management system according to an embodiment of the present invention.

In an alternative embodiment of the present invention, an extension of the CMS system 500 is possible, where a hierarchy of CMS providers 502 (i.e., CMS organizations) could exist. Referring to FIG. 11, a block diagram illustrating a hierarchical collateral management system 1100, according to an embodiment of the present invention, is shown. The CMS 1100 includes a master CMS provider 1102 and a plurality of "subsidiary" CMS's 500 (shown as CMS 500a–500n), each with a CMS provider (shown as CMS providers 502a–502n). The plurality of CMS providers 502a–502n may or may not be independent (corporate) entities. Further, a company (e.g., Company A) can be part of one or more CMS's 500. Each company, however, with their respective counterparties, would identify the specific trades (i.e., deals, etc.) that they will facilitate through each of the subsidiary CMS providers 502a–502n.

Each of the subsidiary CMS providers 502a–502n can perform steps 904–910 and can also issue Collateral Credits for their respective sub-portfolio. Each of the subsidiary CMS providers 502a–502n would then pass all of their sub-portfolio information to the master CMS provider 1102. The master CMS provider 1102 would aggregate the MTM collateral requirements, calculate the total anticipatory collateral requirements, and then issue additional Collateral Credits. The results of the MTM aggregation is then passed back to the subsidiary CMS providers 502a–502n.

If a company is owed money in one of the subsidiary CMS 500a–500n and owes money in another, this information is also transferred. The Collateral Credits issued by the master CMS provider 1102 are distributed appropriately to the subsidiary CMS providers 502a–502n. Each of the subsidiary CMS providers 502a–502n would then notify the companies facilitating trades through them of their respective collateral requirements.

In yet another alternative embodiment of the present invention, an extension of the CMS system 500 is possible where a network of CMS providers 502 (i.e., CMS organizations) could exist. In such an embodiment, every company must designate one CMS provider 502 as their "aggregator." In this situation each CMS in the network would pass all information regarding that company to the designator aggregator CMS provider 502. The hierarchical CMS 1100 is simply a special case of the network embodiment where all of the companies have identified the same CMS provider as their aggregator—the master CMS provider 1102. The aggregator CMS provider 502 would determine the appropriate collateral movements for each company designating it as their aggregator, and issue Collateral Credits. This information would be passed to the other CMS providers 502 in the network just as in the hierarchical CMS 1100.

V. Environment

Figure 12:
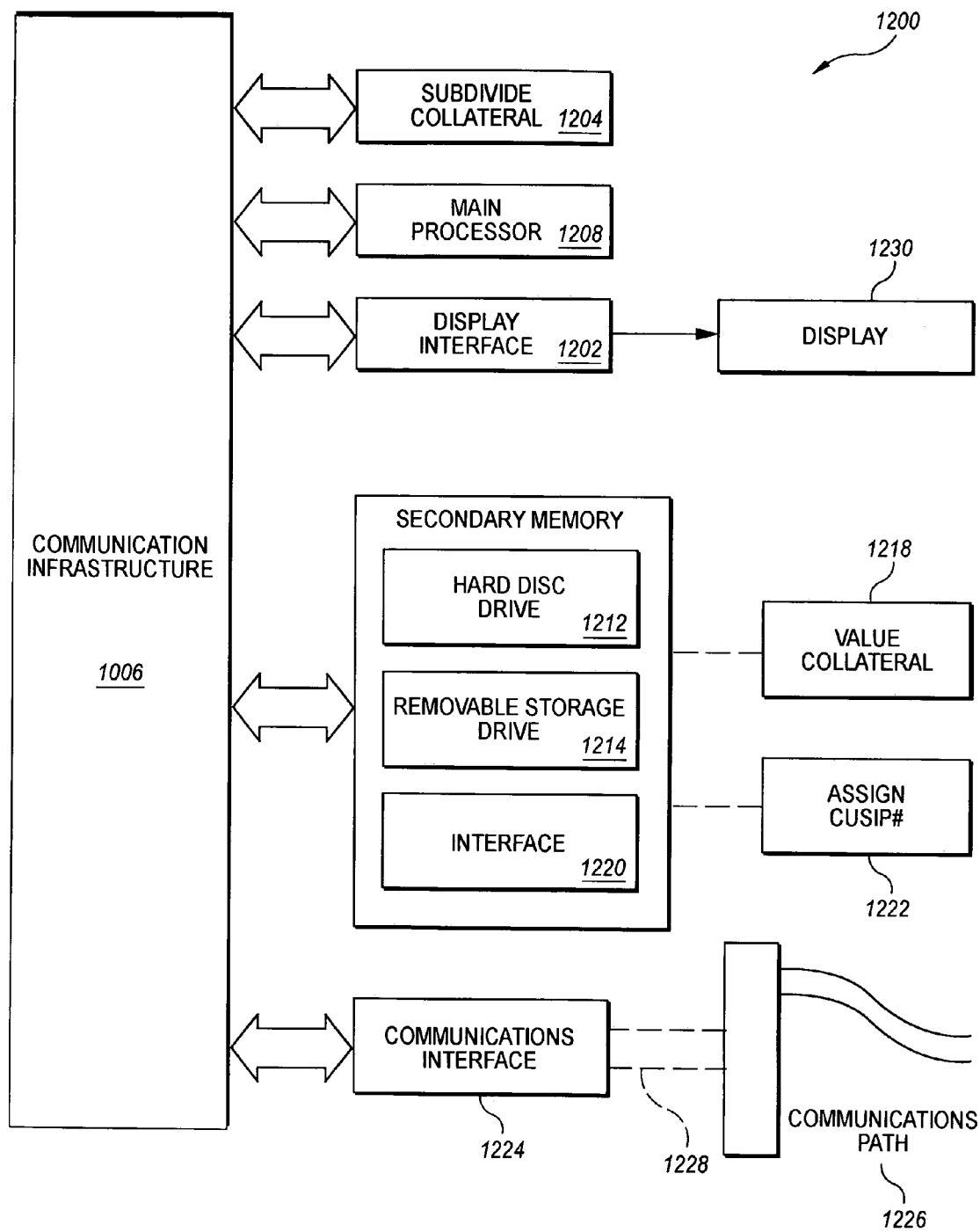
FIG. 12 is a block diagram of an exemplary computer system useful for implementing the present invention.

The present invention (e.g., collateral management process 900, or any part thereof) can be implemented using hardware, software or a combination thereof and can be implemented in one or more computer systems or other processing systems. In fact, in one embodiment, the invention is directed toward one or more computer systems capable of carrying out the functionality described herein. An example of a computer system 1200 is shown in FIG. 12. The computer system 1200 includes one or more processors, such as processor 1204. The processor 1204 is connected to a communication infrastructure (e.g., a bus) 1206. Various software embodiments are described in terms of this exemplary computer system. After reading this description, it will be apparent to a person skilled in the relevant art how to implement the invention using other computer systems and/or computer architectures.

Computer system 1200 can include a display interface 1202 that forwards graphics, text, and other data from the communication infrastructure 1206 (or from a frame buffer not shown) for display on a display unit 1230. Computer system 1200 also includes a main memory 1208, preferably random access memory (RAM), and can also include a secondary memory 1210. The secondary memory 1210 can include, for example, a hard disk drive 1212 and/or a removable storage drive 1214, representing a floppy disk drive, a magnetic tape drive, an optical disk drive, etc. The removable storage drive 1214 reads from and/or writes to a removable storage unit 1218 in a well known manner. Removable storage unit 1218, represents a floppy disk, magnetic tape, optical disk, etc. which is read by and written to by removable storage drive 1214. As will be appreciated, the removable storage unit 1218 includes a computer usable storage medium having stored therein computer software and/or data.

In alternative embodiments, secondary memory 1210 can include other similar means for allowing computer programs or other instructions to be loaded into computer system 1200. Such means can include, for example, a removable storage unit 1222 and an interface 1220. Examples of such can include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1200.

Computer system 1200 can also include a communications interface 1224. Communications interface 1224 allows software and data to be transferred between computer system 1200 and external devices. Examples of communications interface 1224 can include a modem, a network interface (such as an Ethernet card), a communications port, a PCMCIA slot and card, etc. Software and data transferred via communications interface 1224 are in the form of signals 1228 which can be electronic, electromagnetic, optical or other signals capable of being received by communications interface 1224. These signals 1228 are provided to communications interface 1224 via a communications path (i.e., channel) 1226. This channel 1226 carries signals 1228 and can be implemented using wire or cable, fiber optics, a phone line, a cellular phone link, an RF link and other communications channels.

In this document, the term "computer program product" refers to removable storage units 1218, 1222, and signals 1228. These computer program products are means for providing software to computer system 1200. The invention is directed to such computer program products.

Computer programs (also called computer control logic) are stored in main memory 1208, and/or secondary memory 1210 and/or in computer program products. Computer programs can also be received via communications interface 1224. Such computer programs, when executed, enable the computer system 1200 to perform the features of the present invention as discussed herein. In particular, the computer programs, when executed, enable the processor 1204 to perform the features of the present invention. Accordingly, such computer programs represent controllers of the computer system 1200.

In an embodiment where the invention is implemented using software, the software can be stored in a computer program product and loaded into computer system 1200 using removable storage drive 1214, hard drive 1212 or communications interface 1224. The control logic (software), when executed by the processor 1204, causes the processor 1204 to perform the functions of the invention as described herein.

In another embodiment, the invention is implemented in a distributed (i.e., client-server) computer system over a network, rather than the stand-alone fashion of computer system 1200.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VI. CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

More specifically, the financial pricing and risk models used to calculate MTM and anticipatory collateral, as presented herein, are for example purposes only and can vary. As will be apparent to one skilled in the relevant art(s), the CMS provider 502 and the trading group members (A–J) can generally pre-select these models by (membership) agreement when forming the CMS 500. Furthermore, the CMS 500 as presented herein is sufficiently flexible and configurable to accommodate these varying models.

Thus the present invention should not be limited by any of the above-described exemplary embodiments, but should be defined only in accordance with the following claims and their equivalents.

What is claimed is:

1. A method for providing centralized collateral management between a group of users, wherein each of the users has a portfolio of assets within a network of obligations, and wherein each of the users has a sub-portfolio of obligations with respect to each other, comprising the steps of:
    (1) determining a mark to market (MTM) by use of a computer value for each of the sub-portfolios;
    (2) providing MTM Collateral Credits by use of a computer up to the MTM gains on each of the sub-portfolios;
    (3) notifying the users of their respective total collateral obligations;
    (4) notifying the users of the value of their respective MTM Collateral Credits;
    (5) receiving any required collateral from each of the users; and (6) allocating said received collateral by use of a computer against the sub-portfolios of each of the users;

whereby the total amount of collateral posted by each of the users is minimized by said MTM Collateral Credits and is used to protect against actual losses due to the potential inability of the collateral provider to fulfill its obligations.

2. The method of claim 1, wherein step (1) comprises the steps of:
(a) obtaining, directly from at least one of the users, market positions for each asset contained in its sub-portfolio; and
(b) obtaining market data in order to valuate each of said market positions.

3. The method of claim 1, wherein step (1) comprises the step of:
obtaining, directly from at least one of the users, said MTM value for its sub-portfolio.

4. The method of claim 1, wherein step (1) comprises the step of:
obtaining, directly from an external service, said MTM value for at least one of the sub-portfolios.

5. The method of claim 1, wherein step (2) comprises the step of:
calculating the value of said MTM Collateral Credits using the following equation:

$$\sum_{i=1}^{N} \max\{MTM_{ji}, 0\}$$

wherein $MTM_{ji}$ is said MTM value for the sub-portfolio of obligations between a user j and a user i, and N is the total number of users with whom said user j has existing obligations.

6. The method of claim 1, wherein said collateral received in step (5) corresponds to at least one of the following collateral assets:
(i) cash;
(ii) securities;
(iii) letters of credit;
(iv) parent guarantees; and
(v) self guarantees.

7. The method of claim 1, wherein step (6) comprises the step of:
allocating said received collateral between each of the sub-portfolios using rehypothecation.

8. The method of claim 1, wherein risk is not mutualized among the group of users.

9. The method of claim 1, wherein risk is mutualized among the group of users.

10. The method of claim 1, wherein each of the users has a sub-portfolio of assets that derive at least in part from over the counter trading.

11. The method of claim 10, wherein risk is mutualized among the group of users.

12. A method for providing centralized collateral management between a group of users, wherein each of the users has a portfolio of assets within a network of obligations, and wherein each of the users has a sub-portfolio of obligations with respect to each other, comprising the steps of:
(1) determining a mark to market (MTM) by use of a computer value for each of the sub-portfolios;
(2) determining an anticipatory collateral by use of a computer value for the portfolios and sub-portfolios of each of the users;
(3) providing Anticipatory Collateral Credits by use of a computer to each of the users based on the difference between said anticipatory collateral value of the sub-portfolios and portfolios of each of the users;
(4) notifying the users of their respective total collateral obligations;
(5) notifying the users of the value of their respective said Anticipatory Collateral Credits;
(6) receiving any required collateral from each of the uses; and
(7) allocating said received collateral by use of a computer against the sub-portfolios of each of the users;

whereby the amount of collateral posted by each of the users is minimized by said Anticipatory Collateral Credits and is used to protect against potential future losses due to the potential inability of the collateral provider to fulfill its obligations.

13. The method of claim 12, wherein step (2) comprises the step of:
determining said anticipatory collateral value for the portfolios and sub-portfolios by performing one of the following Value at Risk methods:
(i) variance-covariance;
(ii) Monte Carlo simulation; and
(iii) historical.

14. The method of claim 13, wherein step (2) further comprises the step of:
refining said anticipatory collateral value determination for each of the portfolios and sub-portfolios by performing one of the following refinement methods:
(iv) fundamental models;
(v) scenario testing; and
(vi) stress testing.

15. The method of claim 12, wherein step (2) comprises the step of:
calculating said anticipatory collateral value, AC, for each of the portfolios and sub-portfolios using the following equation:

$$AC = P*\sigma*N'(CI)$$

wherein P is said MTM value for the sub-portfolio or portfolio, $\sigma$ is the volatility value for the sub-portfolio or portfolio, N'( ) is the inverse normal probability distribution, and CI is a pre-selected confidence interval.

16. The method of claim 15, wherein step (3) comprises the step of:
calculating the value of said Anticipatory Collateral Credits using the following equation:

$$\sum_{i=1}^{N} AC_{ji} - AC_{jP}$$

wherein $AC_{jp}$ is said anticipatory collateral value for the entire portfolio of a user j, $AC_{ji}$ is said anticipatory collateral value for a sub-portfolio of obligations between said user j and a user i, and N is the total number of users with whom said user j has existing obligations.

17. The method of claim 12, wherein step (4) comprises the step of:
dynamically calculating said anticipatory collateral value for the portfolios and sub-portfolios at each of least one of the following time intervals:

(i) daily;
(ii) weekly;
(iii) monthly; and
(iv) a pre-selected time interval value.

18. The method of claim 12, wherein step (7) comprises the step of:
allocating said received collateral between each of the sub-portfolios using rehypothecation.

19. The method of claim 12, wherein risk is not mutualized among the group of users.

20. The method of claim 12, wherein risk is mutualized among the group of users.

21. The method of claim 12, wherein each of the users has a sub-portfolio of assets that derive at least in part from over the counter trading.

22. The method of claim 21, wherein risk is mutualized among the group of users.

23. The method of claim 12, further comprising the steps of:
(8) providing MTM Collateral Credits up to the MTM gains on each of the sub-portfolios; and
(9) notifying the users of the value of their respective MTM Collateral Credits.

24. A computer program product comprising a computer usable medium having control logic stored therein for causing a computer to provide centralized collateral management between a group of users, wherein each of the users has a portfolio of assets within a network of obligations, and wherein each of the users has a sub-portfolio of obligations with respect to each other, said control logic comprising:
first computer readable program code means for causing the computer to determine a mark to market (MTM) value for each of the sub-portfolios;
second computer readable program code means for causing the computer to provide MTM Collateral Credits up to the MTM gains on each of the sub-portfolios;
third computer readable program code means for causing the computer to notify the users of their respective total collateral obligations;
fourth computer readable program code means for causing the computer to notify the users of the value of their respective MTM Collateral Credits;
fifth computer readable program code means for causing the computer to acknowledge receipt of any required collateral from each of the users; and
sixth computer readable program code means for causing the computer to allocate said received collateral against the sub-portfolios of each of the users;
whereby the total amount of collateral posted by each of the users is minimized by said MTM Collateral Credits and is used to protect against actual losses due to the potential inability of the collateral provider to fulfill its obligations.

25. A computer program product comprising a computer usable medium having control logic stored therein for causing a computer to provide centralized collateral management between a group of users, wherein each of the users has a portfolio of assets within a network of obligations, and wherein each of the users has a sub-portfolio of obligations with respect to each other, said control logic comprising:
first computer readable program code means for causing the computer to determine a mark to market (MTM) value for each of the sub-portfolios;
second computer readable program code means for causing the computer to determine an anticipatory collateral value for the portfolios and sub-portfolios of each of the users;
third computer readable program code means for causing the computer to provide Anticipatory Collateral Credits to each of the users based on the difference between said anticipatory collateral value of the sub-portfolios and portfolios of each of the users;
fourth computer readable program code means for causing the computer to notify the users of their respective total collateral obligations;
fifth computer readable program code means for causing the computer to notify the users of the value of their respective said Anticipatory Collateral Credits;
sixth computer readable program code means for causing the computer to acknowledge receipt any required collateral from each of the uses; and
seventh computer readable program code means for causing the computer to allocate said received collateral against the sub-portfolios of each of the users;
whereby the amount of collateral posted by each of the users is minimized by said Anticipatory Collateral Credits and is used to protect against potential future losses due to the potential inability of the collateral provider to fulfill its obligations.

26. The computer program product of claim 25, further comprising:
eighth computer readable program code means for causing the computer to provide MTM Collateral Credits up to the MTM gains on each of the sub-portfolios; and
ninth computer readable program code means for causing the computer to notify the users of the value of their respective MTM Collateral Credits.

* * * * *